United States Patent [19]

Harvey

[11] Patent Number: 4,837,620

[45] Date of Patent: Jun. 6, 1989

[54] TELETEXT RECEIVER WITH PAGE UP AND PAGE DOWN FUNCTIONS

[75] Inventor: Timothy J. Harvey, Northbrook, Ill.

[73] Assignee: Zenith Electronics Corporation, Glenview, Ill.

[21] Appl. No.: 193,463

[22] Filed: May 12, 1988

[51] Int. Cl.$^4$ .............................................. H04N 7/08
[52] U.S. Cl. ..................................... 358/142; 358/147
[58] Field of Search ....................... 358/142, 146, 147

[56] References Cited

U.S. PATENT DOCUMENTS 4,679,083  7/1987  Schmitz et al. .................. 358/146
4,701,794  10/1987  Fröling et al. .................... 358/146

FOREIGN PATENT DOCUMENTS 0170374  9/1985  Japan ................................ 358/160

*Primary Examiner*—James J. Groody
*Assistant Examiner*—Michael D. Parker

[57] ABSTRACT

A teletext system with multiple page teletext memory includes a page up and a page down function. Upon direct access of a page of teletext data, appropriate flags are set in the sector memory and the preceding page of data and the four successive pages of data are also acquired and stored. Corresponding page numbers are placed in the page request register and in response to a page up or page down command, a display register is incremented or decremented, respectively, to display the next page of data. The high page and low page information is recalculated by the CCU and the teletext system acquires a new page of teletext data to replace a page that is being discarded. Should a page request be made via the up/down page commands for a page that has not been completely acquired, the system reverts to a direct access mode of operation and the cycle is repeated.

8 Claims, 2 Drawing Sheets

TELETEXT RECEIVER WITH PAGE UP AND PAGE DOWN FUNCTIONS

BACKGROUND OF THE INVENTION

This invention relates generally to teletext (TTX) systems and particularly to teletext systems having multiple page memory storage. Teletext systems, wherein primarily textual information is transmitted during the vertical blanking intervals of a television signal, have been known for some time. Such systems have been slow to gain popularity in the United States, although they have been in use in Europe for a number of years. To obtain the benefits of teletext transmissions, a teletext processor or decoder is required. Generally, processor circuitry is incorporated into a television receiver to enable acquisition of the transmitted data and the storing of that data in a teletext page memory. The teletext signal format involves a series of magazines each having up to 100 pages that are transmitted one after the other in a cyclical manner. TTX data is acquired by means of user entered magazine and page number requests. When a circulating page of TTX data has been acquired, the information is displayed on the cathode ray tube (CRT) in the viewer's television receiver. Some teletext processors have relatively large memories and are capable of acquiring a plurality of pages of TTX data. In U.S. Pat. No. 4,388,645, multiple page storage of TTX data is provided in a cable system. In that arrangement, the cable head-end is provided with means for acquiring a multiplicity of teletext pages and for arranging for their appropriate transmission at predetermined times.

In the publication, Digit 2000 VLSI Digital TV System, Edition 1984/5, by Intermetall Semiconductors of ITT, which publication is hereby incorporated by reference, a teletext processor unit (TPU) is described in which up to eight pages may be acquired in response to appropriate user input commands. Minimum acquisition delay would be experienced when reading through the pages of TTX data that are in the memory.

The system described in the Digit 2000 publication thus provides for easy and fast "paging" among a group of user preselected teletext pages. The system of the U.S. Pat. No. 4,388,645 patent provides for retransmission of previously acquired pages of TTX data based upon a time code inserted by the cable operator, when the data is acquired. The present invention is directed to a system in which responsive to a user request for a desired page of TTX data, a number of predetermined adjacent pages of TTX data are automatically acquired and placed in memory and are readily available for viewing in response to simple page up and page down commands.

OBJECTS OF THE INVENTION

A principal object of the invention is to provide a novel teletext system.

Another object of the invention is to provide an automatic teletext system in which access time between adjacent teletext pages is minimized.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
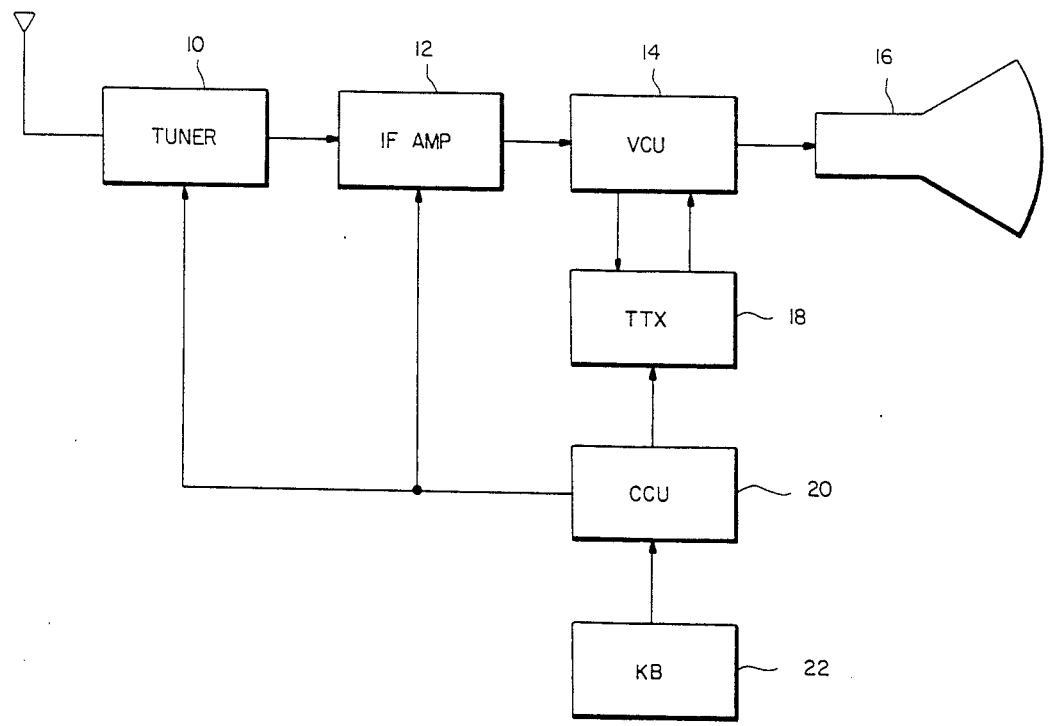
FIG. 1 is a simplified block diagram of a television receiver and TTX system of the prior art.

In FIG. 1, a television signal tuner receives signals from an antenna or the like and supplies them to an IF amplifier 12 where they are detected and processed by well-known means (not shown). The output of IF amplifier 12 is supplied to a video CODEC unit (VCU) 14 which in turn supplies a CRT 16. A TTX processor 18 is bidirectionally coupled to VCU 14 and is in turn controlled by a microprocessor based central control unit (CCU) 20. CCU 20 controls operation of tuner 10, IF amplifier 12 and other portions of the television receiver, which have been omitted for simplicity. A keyboard (KB) 22 is coupled to CCU 20 and enables a user to control the functioning of the television receiver and TTX processor. It will be appreciated that keyboard 22 may be supplemented by a remote control system for permitting control of CCU 20 by a user from a distance. The FIG. 1 depiction is essentially that of the VLSI Digit 2000 Digital TV System of the Publication mentioned above.

Figure 2:
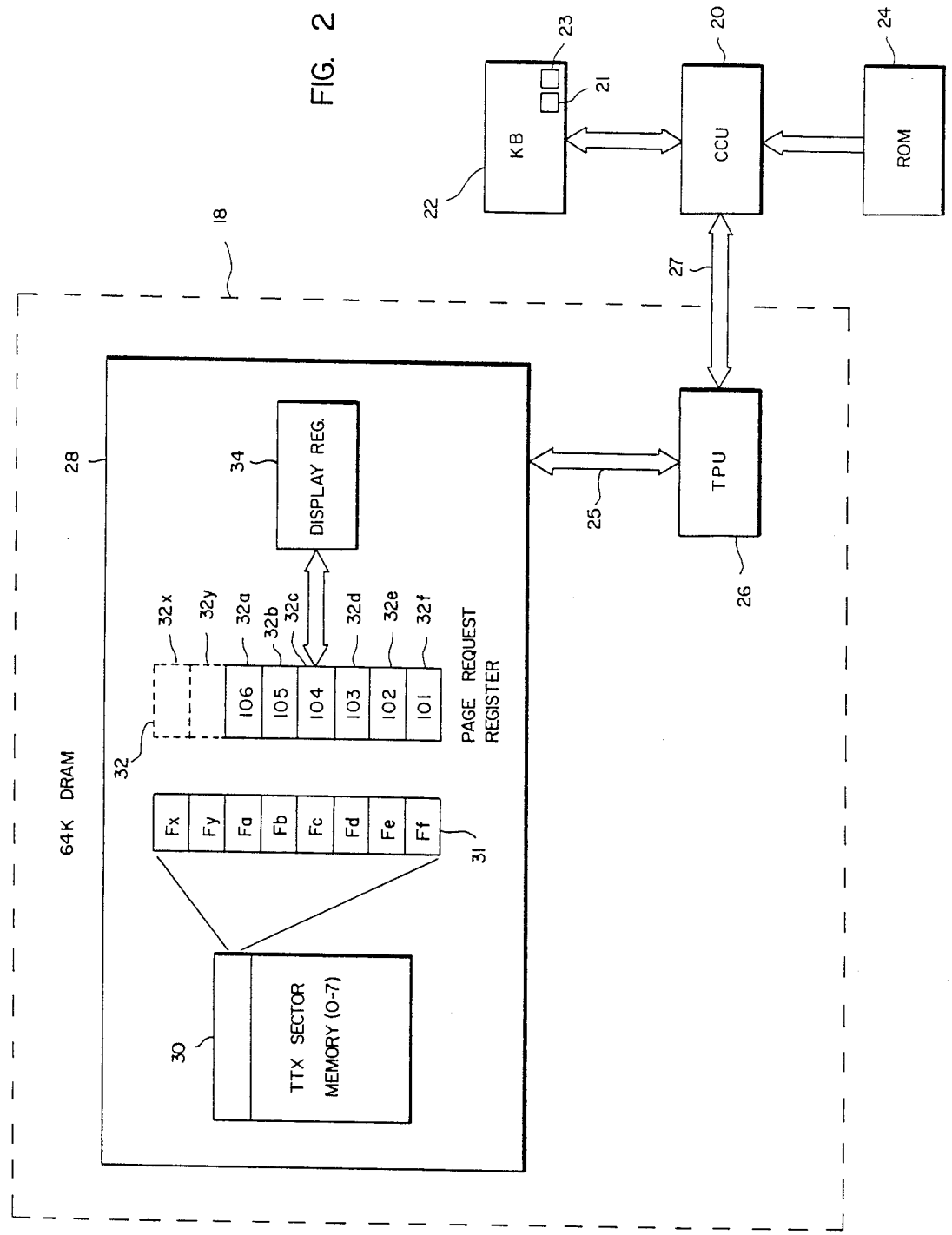
FIG. 2 is a simplified block diagram of the teletext processor constructed in accordance with the invention.

In FIG. 2, TTX processor 18 is indicated by the dashed line box. It includes a memory 28 which is a 64 kilobyte DRAM (dynamic random access memory). The DRAM is organized into a TTX sector memory 30 that includes sectors numbered 0–7 and a page request register 32 for flagging the sectors in sector memory 30 and their contents. A block 31, indicating the flags, is shown between memory 30 and page request register 32, for convenience in description. Page request register 32 includes a plurality of sections 32a–32f, and sectors 32x and 32y which are indicated in dashed lines. Sections 32a–32f are used with the present invention to store a sequence of contiguous pages of TTX data. Sections 32x and 32y are used for other purposes not involved with this invention. The flags in block 31, labelled Fa–Ff and Fx and Fy correspond to the respective sections in the page request register. A display register 34 is interconnected by a bidirectional communications bus with page request register 32. DRAM 28 is also connected via a bidirectional communications bus 25 with a teletext processor unit (TPU) 26 which in turn is connected to CCU 20 by a bidirectional communications bus 27. Keyboard 22 includes buttons 21 and 23 for activating page up and page down functions, respectively. A ROM 24 is coupled to CCU 20 and supplies a program for operating the teletext system in accordance with the invention.

In operation, in response to an acquisition signal from the keyboard 22, the teletext processor sets the appropriate flag in block 31, acquires the page of teletext data that has been requested and places the page number in the page request register. In accordance with the inventive method, appropriate additional flags are set and the teletext system automatically acquires five other pages of teletext data, which are all loaded into sector memory 30. The pages acquired thus form a contiguous sequence of pages of TTX data. Assuming the requested page is P, the system acquires P−1, P, P+1, P+2, P+3 and P+4. For example, if teletext page number 102 is requested, flag Fe is set and flag Ff, corresponding to the adjacent lower page 101 and flags Fa–Fd, corresponding to the four adjacent higher pages 103-106 are set. The corresponding pages of TTX data are then acquired and stored in sector memory 30. As illustrated, the page numbers are identified in the page request register with the requested page 102 occupying section 32e, page 101 occupying 32f, page 103 occupying 32d, etc. Simultaneously, CCU 20 stores information in its memory to indicate the page currently being displayed (page 102), the high page number (106) and the low page number (101) in the sector memory. Thus, in response to a request for page 102, pages 101-106 are acquired, and page 102 is displayed for viewing by the user. (It is not necessary that all pages be completely acquired before display of page 102, however.)

The inventive method is designed to accommodate normal viewer reading habits and acquires four pages of TTX data following the requested page and only a single page preceding the requested page. Normally, a user will read the selected page and "page forward" to read additional pages. Only occasionally will a viewer want to refer back to a prior page. Paging is accomplished by the viewer initiating the page up or page down function either by depression of keys 21 and 23, respectively, on keyboard 22 or by sending an appropriate command via a remote control unit (not shown). In general, the adjacent teletext page will already be in memory 30, and display of that page will occur very rapidly. If, for example, a page up signal is sent, display register 34 reflects page 103 for display on the CRT screen. The low page number in CCU 20 is incremented from 101 to 102, the high page number in CCU 20 is incremented from 106 to 107. The corresponding flags are cleared and set and page number 101 in section 32f is replaced by the next higher page number in the sequence which is 107. The TTX data corresponding to the replaced page number (101) is overwritten as the data corresponding to new TTX page 107 is acquired and stored in the memory in that location. A further page up request would result in number 102 in section 32e being replaced by number 108, display register 34 indicating information corresponding to section 32c and teletext data encompassed between the high and low page numbers. The acquired page numbers are loaded into the page request register. In response to a page up command, the high page number is incremented by one, the low page number is incremented by one, the new sector memory location for the one page of TTX data that is to be acquired is calculated and the display register is incremented by one. An opposite routine is followed for the page down command with the high and low page numbers being decremented by one. It will be appreciated that during the page up and page down functions, only one page of TTX data is replaced in the sector memory. That page of TTX data is replaced with the new page of TTX data.

the incrementing of the low and high page numbers in CCU 20. The TTX page of data in memory 30, corresponding to TTX page 102, is replaced with data corresponding to TTX page 108, as that data is acquired.

A page down request proceeds in the opposite direction with the page number 106 in section 32a being replaced with number 100. The high page, low page and displayed page information in CCU 20 is incremented or decremented as the page up and page down commands are executed.

Under certain circumstances, the user may request TTX pages, through use of the page up and page down commands, at such a rate that the requested page has not yet been acquired. Rather than displaying erroneous data, the software routine provides for jumping out to its normal direct access mode and the system reinitializes itself with the desired page number being treated as a direct request for that page number. This is not perceptible to the user. The software routine also accounts for the "wrap around" in page numbers since the page numbers are restricted to 0-99. The software routine for performing the inventive method is attached hereto as an appendix.

In summary, on direct access, the variables, i.e. high page number, low page number and the displayed page, are established in CCU 20, the appropriate flags are set in the memory and the teletext system acquires all of the

APPENDIX

```
DO CASE TTX_MSG_STATE;   /* Send all 6 initial page requests        */

DO;  /* Write page numbers to page request registers            */

DISPLAYED_PAGE = REQUESTED_PAGE;    /* The displayed page number
                                               is the page we are requesting
                                               in another part of program */

COUNT_TTX = DISPLAYED_PAGE;         /* COUNT_TTX is a dummy variable
                                               used to hold the page number
                                               that will be shown in the
                                               upper right hand corner of
                                               the TV screen.

IF DIGIT_TURN_ON = 1                /* If the user has pressed a digit,
                                               to turn on teletext,        */

THEN DO;                            /* Then change the page number that
                                               will be displayed to FF (which
                                               will result in '??' when sent
                                               to the screen.              */

COUNT_TTX = OFFH;
            DIGIT_TURN_ON = 0;

END;

CALL XMT_SI;                        /* Send magazine number to the
                                               upper right hand corner of the
                                               TV teletext screen. (Status
                                               Indicator register.         */
```

```
        CALL TTX_VAR_XMT (TPU_REG_BASE_S0 + TPU_REG_SI,
                     COUNT_TTX);         /* Send the page number to the
                                             upper right hand corner of the
                                             TV teletext screen. (Status
                                             Indicator register.          */

TTX_MSG_STATE = TTX_MSG_STATE + 1;  /* move on to the next block
                                               (Reordering stack)         */

END;

DO; /* Reordering stack                                                   */

PTR_TTX = TPU_REG_BASE_S0 + (2 * DISPLAYED_SECTOR);
                                    /* Set a pointer to the proper
                                       page request register that
                                       corresponds to the currently
                                       displayed sector( which would
                                       be 3 if this is the first time
                                       the user has activated Teletext*/

COUNT_TTX = 5;                  /* Load a dummy variable with 5
                                       so that a loop can calculate
                                       and transmit the proper page
                                       requests for the page requested
                                       and the 4 pages above. The
                                       lowest page is taken care of
                                       inside the loop below.         */

DO WHILE COUNT_TTX > 0;

CALL TTX_VAR_XMT (PTR_TTX, 10H OR MAG_NUMBER);
                                    /* Send Magazine number and
                                       New Request Flag to the
                                       correct page request register */

CALL TTX_VAR_XMT (PTR_TTX + 1, REQUESTED_PAGE);
                                    /* Send Page number to the correct
                                       page request register         */

COUNT_TTX = COUNT_TTX - 1;  /* Now that the page request has
                                       been sent, decrement the loop
                                       counter,                      */

PTR_TTX = PTR_TTX + 2;      /* adjust the page request pointer
                                       so that it points to the
                                       next page request register in
                                       the DRAM.                     */

IF PTR_TTX > TPU_REG_BASE_S0 + TPU_REG_PR7
        THEN PTR_TTX = TPU_REG_BASE_S0 + TPU_REG_PR2;
                                    /* The above lines adjust the
                                       pointer if the pointer goes
                                       past the end of the page
                                       request registers. This
                                       happens if the displayed
                                       sector is greater than 3     */

IF COUNT_TTX = 0            /* If the highest page has been
                                       transmitted, send the lowest
                                       page.                        */

THEN DO;  /* Set high and low page number variables and send low
                     page request                                   */

HI_PAGE = REQUESTED_PAGE;   /* Set the HIGH_PAGE number. */

REQUESTED_PAGE = TTX_HEX_TO_BCD_DEC(DISPLAYED_PAGE);
            REQUESTED_PAGE = REQUESTED_PAGE - 1;
                                    /* Adjust the HIGH_PAGE number
                                       accounting for wrap around at
                                       page 00.                     */
```

```
            CALL TTX_VAR_XMT (PTR_TTX, 10H OR MAG_NUMBER);
            CALL TTX_VAR_XMT (PTR_TTX + 1, REQUESTED_PAGE);
                                        /* Send the lowest page request to
                                           the page request register.    */

LO_PAGE = REQUESTED_PAGE;      /* Set the LOW_PAGE variable      */

END;

ELSE DO;                          /* If the highest page has
                                           not been reached yet,
                                           adjust the requested page
                                           number and continue with
                                           loop.                          */

REQUESTED_PAGE = REQUESTED_PAGE + 1;
         REQUESTED_PAGE = TTX_HEX_TO_BCD_INC(REQUESTED_PAGE);
                                        /* The functions
                                           TTX_HEX_TO_BCD_INC and
                                           TTX_HEX_TO_BCD_DEC adjust
                                           the variable REQUESTED_PAGE
                                           taking into account the
                                           wrap around at page 99 and
                                           page 00.                       */

IF COUNT_TTX = 4               /* If the first page has
                                           been sent to the page
                                           request register, we can
                                           now display it.                */
             THEN CALL TTX_VAR_XMT (TPU_REG_BASE_S0 + TPU_REG_DS,
                         DISPLAYED_SECTOR);
      END;

END;

TTX_MSG_STATE = TTX_MSG_STATE + 1; /* Continue with next block          */

END;

END;

DO CASE TTX_MSG_STATE; /* PAGE UP AND DOWN FUNCTION                        */

DO; /* Set proper page requests                                         */

IF PAGE_UP_DOWN = 1               /* This variable is set elsewhere
                                           in the program and will be 1 if
                                           a page up is to be done, 0 if
                                           a page down is to be done.     */

THEN DO;  /* Page up functions                                       */

HI_PAGE = HI_PAGE + 1;         /* Increment the HIGH_PAGE number  */

HI_PAGE = TTX_HEX_TO_BCD_INC( HI_PAGE );  /* Adjust for wrap
                                                       around.            */

LO_PAGE = LO_PAGE + 1;         /* Increment the LOW_PAGE number   */

LO_PAGE = TTX_HEX_TO_BCD_INC( LO_PAGE );  /* Adjust for wrap
                                                       around.            */

PTR_TTX = TPU_REG_BASE_S0 + (2 * DISPLAYED_SECTOR) - 2;
                                        /* Set a pointer to the page request
                                           register that we want to replace.
                                           For a page up, we will want to
                                           replace the LOW page with the
                                           next highest page.             */

IF PTR_TTX < TPU_REG_BASE_S0 + TPU_REG_PR2
         THEN PTR_TTX = PTR_TTX + 12;
                                        /* Adjust the pointer for possible
                                           wrap around from request register
                                           2 to request register 7.       */
```

```
        CALL TTX_VAR_XMT (PTR_TTX, 10H OR MAG_NUMBER);
        CALL TTX_VAR_XMT (PTR_TTX + 1, HI_PAGE);
                                    /* Send out the new HIGHEST page
                                       to the proper page request
                                       register and set the New Request
                                       Flag.                         */

DISPLAYED_PAGE = DISPLAYED_PAGE + 1;  /* Increment the displayed
                                                 Page number.        */
        DISPLAYED_PAGE = TTX_HEX_TO_BCD_INC( DISPLAYED_PAGE);
                                              /* Adjust for wrap around. */

DISPLAYED_SECTOR = DISPLAYED_SECTOR + 1; /* Increment the displayed
                                                    sector.          */
        IF DISPLAYED_SECTOR = 8
        THEN DISPLAYED_SECTOR = 2;            /* Adjust the displayed
                                                 sector accounting
                                                 for wrap around.    */

END;

ELSE DO;  /* Page down functions                                  */

HI_PAGE = TTX_HEX_TO_BCD_DEC( HI_PAGE );
                                    /* Adjust for wrap around */
        HI_PAGE = HI_PAGE - 1;      /* Decrement the HIGH PAGE */

LO_PAGE = TTX_HEX_TO_BCD_DEC( LO_PAGE );
                                    /* Adjust for wrap around. */
        LO_PAGE = LO_PAGE - 1;      /* Decrement the LOW PAGE  */

PTR_TTX = TPU_REG_BASE_S0 + (2 * DISPLAYED_SECTOR) + 8;
                                    /* Set a pointer to the page request
                                       register that we want to replace.
                                       For a page down, we will want to
                                       replace the HIGH page with the
                                       next lowest page.             */

IF PTR_TTX > TPU_REG_BASE_S0 + TPU_REG_PR7
        THEN PTR_TTX = PTR_TTX - 12;
                                    /* Adjust the pointer for possible
                                       wrap around from request register
                                       7 to request register 2.      */

CALL TTX_VAR_XMT (PTR_TTX, 10H OR MAG_NUMBER);
        CALL TTX_VAR_XMT (PTR_TTX + 1, LO_PAGE);
                                    /* Send out the new LOWEST page
                                       to the proper page request
                                       register and set the New Request
                                       Flag.                         */

DISPLAYED_PAGE = TTX_HEX_TO_BCD_DEC( DISPLAYED_PAGE );
        DISPLAYED_PAGE = DISPLAYED_PAGE - 1;  /* Decrement the displayed
                                                 page and adjust for wrap
                                                 around.             */
        DISPLAYED_SECTOR = DISPLAYED_SECTOR - 1;
        IF DISPLAYED_SECTOR = 1               /* Decrement the displayed
                                                 sector and adjust for wrap
                                                 around.             */
        THEN DISPLAYED_SECTOR = 7;

END;

TTX_MSG_STATE = TTX_MSG_STATE + 1;   /* go to the next block.
                                            (set page selection)  */

DAC1_REG = NRT + DSEN;
    CALL XMT_DAC1;
END;
```

```
DO; /* Set page selection for displayed page                         */

CALL IM_WRITE_16 ( 7BH, TPU_REG_BASE_S0 +
                      (2 * DISPLAYED_SECTOR));
                           /* Now we must check to see if the
                              page we are about to display
                              has been received yet.         */

CALL TPU_STATUS_CHK;           /* Wait for free TPU      */

COUNT_TTX = IM_READ_8( 7CH );
    IF (COUNT_TTX AND 10H) = 0     /* If bit is reset, the
                                      transition from 1 to 0
                                      has occured, indicating
                                      page is received       */

THEN DO; /* Display the sector that the requested page is in */

CALL TPU_STATUS_CHK;            /* Wait for free TPU    */

CALL TTX_VAR_XMT (TPU_REG_BASE_S0 + TPU_REG_DS, /* Set the TPU
                                                           to display the
                                                           correct sector */
                         DISPLAYED_SECTOR);

TTX_MSG_STATE = TTX_MSG_STATE + 1; /* go to next block
                                              (set status indicator) */
    END;

ELSE DO; /* Setup to request this new page                    */

/* Since the page we want has not been
                              acquired yet, we can treat this
                              situation as though it were a direct
                              access page request ( the first
                              section ). Therefore, we must set
                              the pointers in the program to
                              execute that part of the program. */

TTX_MSG = RESET_PR_MSG_PTR;
        TTX_MSG_STATE = 3;

REQUESTED_PAGE = DISPLAYED_PAGE;

IF PAGE_UP_DOWN = 1        /* This part keeps the TPU displaying
                                      the same sector. Otherwise, the
                                      previously aquired pages would
                                      cycle through when the page up or
                                      page down key is held down for
                                      a long enough time (so that none
                                      of the pages have been recieved
                                      yet.)                    */
        THEN DO;
            IF DISPLAYED_SECTOR = 2
            THEN DISPLAYED_SECTOR = 8;
            DISPLAYED_SECTOR = DISPLAYED_SECTOR - 1;
        END;
        ELSE DO;
            IF DISPLAYED_SECTOR = 7
            THEN DISPLAYED_SECTOR = 1;
            DISPLAYED_SECTOR = DISPLAYED_SECTOR + 1;
        END;

END;

END;

DO; /* Set status indicator                                        */

CALL XMT_SI;          /* Send the magazine number to the upper
                             left hand corner of the TV teletext
                             screen.                             */

CALL TTX_VAR_XMT (TPU_REG_BASE_S0 + TPU_REG_SI,
                     DISPLAYED_PAGE);  /* Send the page number to
                                          the upper left hand corner
                                          of the TV teletext screen. */
```

```
    TTX_MSG = 0;                        /* We are done.Reset TTX system */
    TTX_MSG_STATE = 0;
    PRIORITY_FLAGS.TPU_REQUEST = 0;
  END;
END;
```

I claim:

1. A method of operating a teletext system comprising:
   requesting a desired page of teletext data;
   storing a predetermined sequence of contiguous pages of teletext data, extending on either side of and including the desired page;
   displaying the desired stored page; and
   displaying an adjacent stored page of stored teletext data in response to a paging command.

2. A method of operating a teletext system comprising:
   requesting a desired page of teletext data;
   storing a sequence of contiguous pages of teletext data including the desired page;
   displaying the desired stored page;
   displaying an adjacent stored page of stored teletext data in response to a paging command; and
   replacing a page of stored teletext data at one end of said sequence with a new page of stored teletext data adjacent to the other end of said sequence in response to said paging command.

3. The method of claim 2 wherein said sequence of contiguous pages comprise the teletext page preceding the desired page and the three pages succeeding said desired page.

4. The method of claim 3 including page number request memory means for identifying the stored teletext pages and their stored locations.

5. The method of claim 4 wherein upon receipt of a page up command, the lowest numbered page of stored teletext data is replaced with acquired teletext data corresponding to the next page higher than the highest numbered page of stored teletext data.

6. The method of claim 4 wherein upon receipt of a page down command, the highest numbered page of stored teletext data is replaced with acquired teletext data corresponding to the next page lower than the lowest numbered page of stored teletext data.

7. A method of operating a teletext system comprising:
   requesting a desired page of teletext data by page number;
   displaying the desired stored page of teletext data while;
   acquiring and storing in memory a sequence of pages of teletext data from page $P-1$ to page $P+4$ inclusive; and
   in response to a page up command;
   displaying page $P+1$ while replacing page $P-1$ with page $P+5$.

8. The method of claim 7 wherein in response to a page down command while displaying page $P+1$, page $P$ is displayed and page $P+5$ is replaced with page $P-1$.

* * * * *